United States Patent [19]

Masaki et al.

[11] Patent Number: 5,777,707

[45] Date of Patent: Jul. 7, 1998

[54] COLOR LIQUID CRYSTAL DISPLAY DEVICE AND PROCESS FOR PRODUCING SAME

[75] Inventors: Yuichi Masaki, Kawasaki; Kazuya Ishiwata, Yokosuka; Masaaki Suzuki; Yuko Yokoyama, both of Yokohama, all of Japan

[73] Assignee: Canon Kabushiki Kaisha, Tokyo, Japan

[21] Appl. No.: 679,988

[22] Filed: Jul. 15, 1996

[30] Foreign Application Priority Data

Jul. 14, 1995 [JP] Japan .................. 7-179165
Jul. 10, 1996 [JP] Japan .................. 8-181033

[51] Int. Cl.⁶ ..................... G02F 1/1333; G02F 1/1335
[52] U.S. Cl. ..................... 349/110; 349/106; 349/108
[58] Field of Search ..................... 349/110, 111, 349/106, 108

[56] References Cited

U.S. PATENT DOCUMENTS

| | | | |
|---|---|---|---|
| 4,470,667 | 9/1984 | Okubo et al. | 350/339 F |
| 4,569,574 | 2/1986 | Masaki et al. | 350/334 |
| 4,853,296 | 8/1989 | Fukuyoshi | 428/623 |
| 5,045,418 | 9/1991 | Fukuyoshi | 349/111 |
| 5,177,627 | 1/1993 | Ishiwata et al. | 359/68 |
| 5,282,068 | 1/1994 | Inaba | 349/111 |
| 5,282,070 | 1/1994 | Nishida et al. | 359/67 |
| 5,285,300 | 2/1994 | Suzuki et al. | 359/54 |
| 5,323,252 | 6/1994 | Yoshida et al. | 359/54 |
| 5,345,324 | 9/1994 | Koseki et al. | 349/111 |
| 5,367,393 | 11/1994 | Ohara et al. | 349/111 |
| 5,406,398 | 4/1995 | Suzuki et al. | 359/80 |
| 5,412,494 | 5/1995 | Ishiwata et al. | 359/67 |
| 5,434,688 | 7/1995 | Saitoh et al. | 349/110 |
| 5,461,501 | 10/1995 | Sato et al. | 349/111 |
| 5,528,398 | 6/1996 | Suzuki et al. | 359/68 |
| 5,610,740 | 3/1997 | Kamamori et al. | 349/110 |

FOREIGN PATENT DOCUMENTS

| | | | |
|---|---|---|---|
| 0473168 | 3/1992 | European Pat. Off. | |
| 250416 | 10/1987 | Japan . | |
| 294222 | 12/1987 | Japan . | |
| 63-183421 | 7/1988 | Japan | 349/110 |

Primary Examiner—William L. Sikes
Assistant Examiner—Tiep H. Nguyen
Attorney, Agent, or Firm—Fitzpatrick, Cella, Harper & Scinto

[57] ABSTRACT

A color liquid crystal display device includes a first substrate having thereon a layer of plural color filter segments and a layer of first transparent electrodes disposed in superposition with the layer of color filter segments, a second substrate disposed opposite to and spaced apart from the first substrate and having thereon a layer of second transparent electrodes intersecting with the first transparent electrodes, and a liquid crystal disposed between the first and second substrates so as to form plural color pixels each at a region of intersection of the first and second transparent electrodes superposed with one of the color filter segments while leaving a pixel spacing between the plural color pixels. The first substrate is provided with a first light-interrupting layer comprising a material identical to that of at least one of the plural color filter segments and disposed at a portion of the pixel spacing so as to mask the portion, and at least one of the first and second substrates is provided with a second light-interrupting layer masking a remaining portion of the pixel spacing. The first and second light-interrupting layers as a whole are effective in preventing leakage of light between color pixels, thus providing images with a high contrast and an excellent display quality.

24 Claims, 11 Drawing Sheets

COLOR LIQUID CRYSTAL DISPLAY DEVICE AND PROCESS FOR PRODUCING SAME

FIELD OF THE INVENTION AND RELATED ART

The present invention relates to a color liquid crystal display device for color-displaying various information by utilizing a liquid crystal while light-interrupting a spacing between color filter segments by using a light-interrupting layer and relates to a process for producing the color liquid crystal display device.

Heretofore, a cathode-ray tube (CRT) has been used in a color display apparatus but in recent years, there has been aroused attention to a color liquid crystal panel (device) effecting color display by utilizing a liquid crystal.

FIG. 1 shows an embodiment of such a color liquid crystal panel (device).

Referring to FIG. 1, a color liquid crystal panel (color liquid crystal display device) 1 includes a pair of oppositely disposed transparent glass substrates (lower and upper substrate) 2 and 9.

On the surface of the lower substrate 2, a color filter comprising groups of three color filter segments 3 for red (R), green (G) and blue (B) is formed with a spacing where a light-interruption layer 12 is disposed. On the surface of the color filter 3 and light-interrupting layer 12, a passivation film (thin film) 5 is formed and on the surface of the passivation film 5, a group of transparent electrodes 6 and an optional auxiliary electrode for lowering a wiring resistance (not shown) are formed.

On the other hand, a group of transparent electrode 10 are formed on the surface of the upper substrate 9.

Between the lower and upper substrates 2 and 9, a liquid crystal 11 is disposed.

Outside (above) the upper substrate 9, a backlight apparatus (not shown) is disposed and issues light (backlight) transmitting the respective color filter segments 3 so as to (color-)display various information by using transmitted light fluxes in combination. In the liquid crystal display device (panel) 1 shown in FIG. 1, such light fluxes are observed from the direction of the lower side (below the device 1) on the drawing.

The light-interrupting layer 12 disposed at a spacing between consecutive color filter segments (each constituting a color pixel) may comprise a single layer of metal (e.g., Cr) and is effective in preventing light leakage between respective color pixels to improve a contrast and a display quality of the device 1. The light-interrupting layer 12 may generally be prepared by forming a metal film (e.g., Cr film) on the lower substrate and subjecting the metal film to patterning through a photolithographic step.

However, the metal layer such as the Cr layer has a high reflectivity (reflectance) and a light from the observer side (hereinafter referred to as "external light") is reflected at the surface of the light-interrupting (metal) layer 12 in case where the liquid crystal display device is used in a light or sunny place, such as the outdoors. As a result, display images are not readily viewed, thus resulting in fatigue of eyes in repetitive use for a long time.

For this reason in order to decrease a degree of reflection of external light, the light-interrupting layer 12 is coated with a metal oxide layer to form a lamination structure or the light-interrupting layer 12 per se is formed by using a black resin.

However, the above-described liquid crystal display device essentially employs a member for light-interrupting a spacing between consecutive color pixels (light-interrupting member 12), thus encountering problems including a complicated device structure, an expensive device and a lowering in product yield of a resultant device.

SUMMARY OF THE INVENTION

An object of the present invention is to provide a color liquid crystal display device having a simple layer structure of plural color filter segments (and a first light-interrupting layer) produced readily and improved in display characteristics while lowering, e.g., a degree of reflection of external light.

Another object of the present invention is to provide a process for producing the color liquid crystal display device.

According to the present invention, there is provided a color liquid crystal display device, comprising:

a first substrate having thereon a layer of plural color filter segments and a layer of first transparent electrodes disposed in superposition with the layer of color filter segments; a second substrate disposed opposite to and spaced apart from the first substrate and having thereon a layer of second transparent electrodes intersecting with the first transparent electrodes; and a liquid crystal disposed between the first and second substrates so as to form plural color pixels each at a region of intersection of the first and second transparent electrodes superposed with one of the color filter segments while leaving a pixel spacing between the plural color pixels, wherein the first substrate is provided with a first light-interrupting layer comprising a material identical to that of at least one of the plural color filter segments and disposed at a portion of the pixel spacing so as to mask the portion, and at least one of the first and second substrates is provided with a second light-interrupting layer masking a remaining portion of the pixel spacing.

According to the present invention, there is further provided a process for producing a color liquid crystal display device having plural color pixels with a pixel spacing, comprising the steps of:

(a) forming plural color filter segments on a first substrate while leaving a prescribed spacing between the plural filter segments, (b) forming a first light-interrupting layer at a portion of the pixel spacing so as to mask the portion, (c) forming first transparent electrodes on or above the first light-interrupting layer via a layer, (d) forming a second light-interrupting layer on the first transparent electrodes so as to mask a portion of the pixel spacing to provide a treated first substrate, (e) forming second transparent electrodes on or above a second substrate, (f) forming a second light-interrupting layer on the second transparent electrodes so as to mask a remaining portion of the pixel spacing to provide a treated second substrate, and (g) disposing a liquid crystal between the treated first substrate and the treated second substrate while oppositely spacing the substrates apart from each other and causing the first and second transparent electrodes to intersect with each other and face the liquid crystal so as to form the plural color pixels each at a region of intersection of the first and second transparent electrodes superposed with one of the color filter segments while leaving the pixel spacing between the plural color pixels.

These and other objects, features and advantages of the present invention will become more apparent upon a consideration of the following description of the preferred embodiments of the present invention taken in conjunction with the accompanying drawings.

PREFERRED EMBODIMENTS OF THE INVENTION

Figure 1:
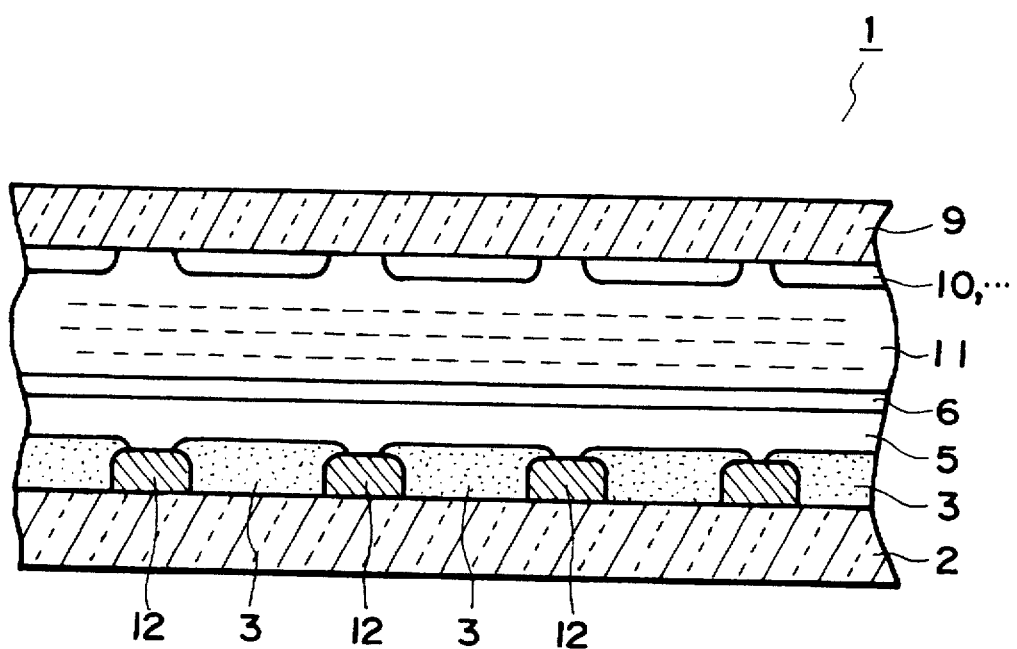
FIG. 1 is a sectional view of a color liquid crystal display device.

In the color liquid crystal display device according to the present invention, light interruption (prevention of light passing or light leakage) is performed by using a first light-interrupting layer formed on a first substrate in combination with one or two second light-interrupting layers formed on the first substrate or/and a second substrate.

The first light-interrupting layer comprises at least one layer comprising a material identical to that of at least one of plural color filter segments, whereby the first light-interrupting layer and the corresponding color filter segment(s) are formed at the same time, thus simplifying a device structure and a production process of the display device.

The second light-interrupting layer comprises, e.g., a layer of auxiliary electrodes composed of a metallic material and disposed in contact with corresponding (first and/or second) transparent electrodes (as specifically described hereinafter).

By appropriately selecting and controlling various characteristics including hue and reflection characteristics (e.g., reflectivity) of the first light-interrupting layer, and arrangement, area ratio and combinations of materials of the second light-interrupting layer in a display region; it is possible to optimize, e.g., a light-interrupting characteristic and reflection characteristics over the entire display region, thus attaining excellent display characteristics.

Incidentally, the first light-interrupting layer exhibits a light-interrupting characteristic different from that of an ordinary black light-interrupting layer (black matrix) consisting of a metallic material generally used for light-interruption between color pixels. More specifically, as described above, the first light-interrupting layer functions so as to effectively suppress complete light transmission between adjacent color pixels in combination with the second light-interrupting layer by appropriately controlling a positional relationship therebetween and area ratios, thus substantially masking an entire spacing between color pixels as a whole.

In the color liquid crystal display device of the present invention, the first substrate provided with a color filter (comprising plural color filter segments) may preferably be disposed on the display face side (i.e., the observer (viewer) side).

Hereinbelow, preferred embodiments of the present invention will be described specifically based on first to sixth embodiments with reference to FIGS. 2–11.

In the following embodiments, a substrate provided with a color filter (as the lower substrate 2 shown in FIG. 1) is referred to as a "first substrate" and another substrate disposed opposite to (and spaced apart from) the substrate provided with the color filter (as the upper substrate 9 shown in FIG. 1) is referred to as a "second substrate". Further, in the first and second embodiments (of FIGS. 2 and 3, respectively), a second substrate has a structure similar to that of the upper substrate 9 shown in FIG. 1 and explanation thereof is omitted.

(First Embodiment)

FIGS. 2A–2F are sectional views of a first substrate 2 along a production process thereof specifically described hereinafter in this embodiment.

Figure 2A:
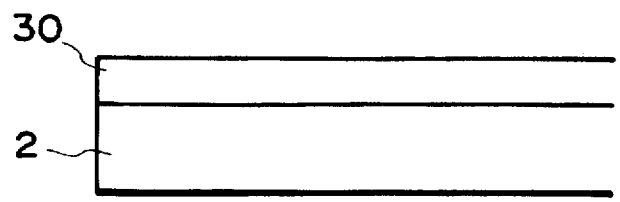
FIGS. 2A–2F are partially sectional views of a color liquid crystal display device according to a first embodiment of the present invention for sequentially illustrating production processes of the display device.
Figure 2B:
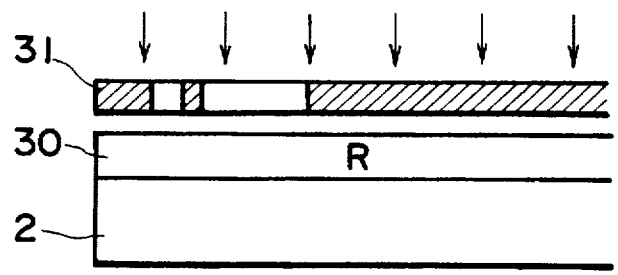
Figure 2C:
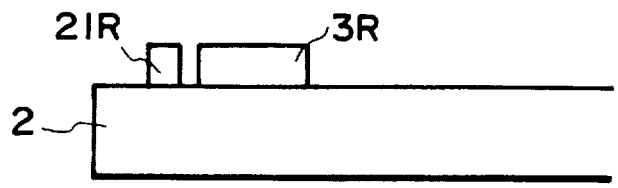
Figure 2D:
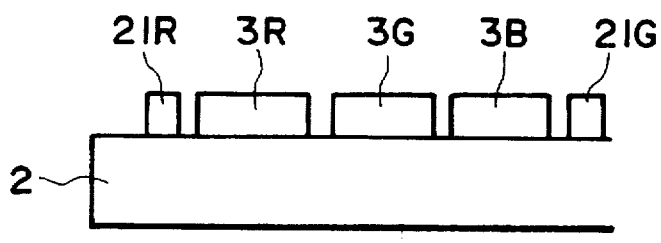
Figure 2E:
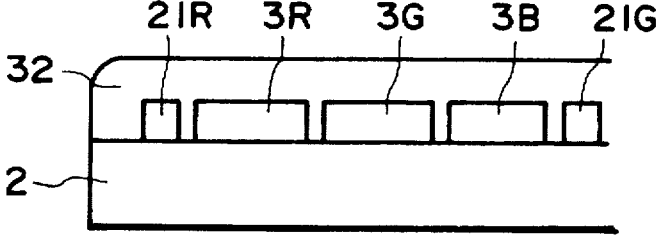
Figure 2F:
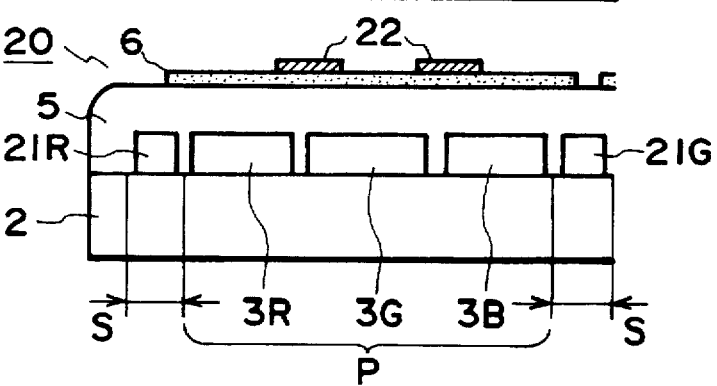

A color liquid crystal display device 20 according to a first embodiment of the present invention includes the first substrate 2 having a structure shown in FIG. 2F. Referring to FIG. 2F, each of display pixels has a region P wherein a red color filter segment 3R (called "red filter"), a green color filter segment 3G (called "green filter") and a blue color filter segment 3B (called "blue filter") each constituting a color pixel and, e.g., comprising a colored resin are disposed. Adjacent (consecutive) display pixels (each consisting of three color pixels 3R, 3G and 3B) are apart from each other with a prescribed spacing S. At each of the respective spacings S, one of first light-interrupting layers 21R, 21G an 21B each comprising a material identical to that of each of color filter segments 3R, 3G and 3B, respectively, is arranged so that three species of the first light-interrupting layers (21R, 21G and 21B) are balanced with each other in dispersion density in a prescribed area and may preferably be disposed in the order of the layers 21R, 21G and 21B (not shown) as shown in FIG. 2F. However, the arrangement of the layers 21R, 21G and 21B may be performed in different orders and manners, as desired.

On the color filter consisting of red filters 3R, green filters 3G and blue filters 3B and the first light-interrupting layers 21R, 21G and 21B (which is not shown in FIG. 2F), a passivation film (thin film) 5 is formed so as to cover (coat) the members 3R, 3G, 3B, 21R, 21G and 21B. Further, a group of transparent electrodes 6 are formed on the passivation film 5, and thereon, auxiliary electrodes 22 are disposed as shown in FIG. 2F.

Each of the auxiliary electrodes 22 comprises a material of a non-transparent metal and is disposed or arranged so that at least a portion of the auxiliary electrode 22 is located in a position corresponding to a spacing between the red filter 3R and the green filter 3G or between the green filter 3G and the blue filter 3B and so that the auxiliary electrodes 22 function as a second light-interrupting layer.

Accordingly, in this (first) embodiment, the spacing S between the adjacent pixels and the spacing between the adjacent color filter segments (two color pixels) can be prevented from being subjected to light passage (light transmission) by the first light-interrupting layer (21R, 21B, 21G) and the second light-interrupting layer (auxiliary electrode 22) in combination, thus substantially allowing a necessary light interruption performance.

Incidentally, additional auxiliary electrodes 22 may be disposed on the transparent substrate 6 (shown in FIG. 2F) at both end portions thereof (masking spacings between 3R and 21R and between 3B and 21G) so as to perform complete light interruption at the spacings S between the pixels in combination with the first light-interrupting layers (21R, 21G and 21B) (not shown).

The production process of the color liquid crystal display device of this embodiment will be specifically described with reference to FIGS. 2A–2F.

<Step of forming a color filter and a first light-interrupting layer>

First, a red pigment dispersion-type photosensitive resin as a color filter material 30 (polyamide-based resin, "PA-1013", available from Ube Kosan K.K.) is applied in a thickness of about 1.5 μm onto the surface of a first substrate 2 by a spinner (not shown) (FIG. 2A), followed by prebaking of 10 minutes at 80° C. The thus treated first substrate 2 is subjected to exposure to ultraviolet (UV) light at a light quantity of 300–600 mJ via a photomask 31 (FIG. 2B). Thereafter, the resultant first substrate 2 is subjected to development, rinse and post-baking of 10 minutes at 230° C., thus forming a red filter (red color filter segment) 3R and a first light-interrupting layer 21R from an identical material at the same time (FIG. 2C).

This step is repeatedly performed with respect to a green filter 3G and a first light-interrupting layer 21G for green (G) and a blue filter 3B and a first light-interrupting layer 21B for blue (B), respectively (FIG. 2D).

<Step of forming a passivation film>

A transparent resin 21 ("PA-1000C", available from Ube Kosan K.K.) is applied by a spinner (not shown) onto the above-treated first substrate 2 (FIG. 2E), followed by heating and curing the transparent resin 21 for 10 minutes at 230° C. to form an about 2 μm-thick passivation film 5.

<Step of forming a transparent electrode>

A group of transparent electrodes 6 are formed in a thickness of 1500 Å by forming an ITO (indium tin oxide) film through sputtering and subjecting patterning through photolithographic steps (FIG. 2F).

<Step of forming an auxiliary electrode (second light-interrupting layer)>

A 1500 Å-thick molybdenum film is formed on the transparent electrode 6 by sputtering and subjected to patterning through photolithographic steps to provide auxiliary electrodes 22 (FIG. 2F). A portion (central portion) of the auxiliary electrode 22 overlaps with a corresponding spacing between corresponding color filter segments (e.g., 3R and 3G) to suppress light leakage therebetween.

Then, on the transparent electrode 6 and the auxiliary electrode 22, an insulating layer and an alignment control layer may be formed as desired.

Separately, a second substrate having thereon transparent electrodes and auxiliary electrodes (similar to the upper substrate 9 as shown in FIG. 1) optionally provided with an insulating layer and an alignment control layer, as desired, is prepared in a similar manner as in the first substrate 2.

The first and second substrates are disposed opposite to and spaced apart from each other with a prescribed gap (cell gap) while causing the groups of transparent electrodes on the first and second substrates to intersect with each other at right angles to provide a matrix electrode structure so as to form plural color pixels each at a region of an intersection of the groups of the transparent electrodes superposed with the plural color filters (color filter segments) while leaving a pixel spacing (e.g., the spacing S or the spacing between 3R and 3G) between the plural color pixels. The gap is filled with a liquid crystal to provide a color liquid crystal display device.

When the color liquid crystal display device is driven in combination with a backlight apparatus, a light (backlight) issued from the backlight apparatus passes through (transmits) the color filter (color filter segments 3R, 3G and 3B) to allow various color display states by various transmitted light components in combination.

According to the first embodiment of the present invention, the first light-interrupting layer (21R, 21G, 21B) is disposed at a portion of the pixel spacing (the spacing S) between adjacent display pixels and the auxiliary electrodes 22 a the second light-interrupting layer are disposed so as to mask a remaining portion of the pixel spacing (e.g., a spacing between adjacent color filter segments 3R and 3G), thus substantially masking the entire pixel spacing (i.e., substantially preventing leakage of incident light (from the backlight apparatus) at the entire pixel spacings between the color pixels including those between the display pixels) at a practically acceptable level although the first light-interrupting layer partially transmits the incident light. As a result, resultant display images are excellent in contrast and display quality.

Further, according to the first embodiment, it is unnecessary to use a light-interrupting member exclusively used for light interruption (e.g., a metal layer of, e.g., chromium (Cr), particularly disposed between color filter segments, such as the layer 12 as shown in FIG. 1) since the fist and second light-interrupting layers used in the present invention are composed of a material identical to the color filter segment material and the auxiliary electrode, respectively, so that a structure and production process of the resultant color liquid crystal display device are simplified to lower production costs. It is also possible to improve a product yield.

The first light-interrupting layer (21R, 21G, 21B) may preferably be arranged suitably in view of a color balance with respect to a prescribed area, whereby no image display region locally takes on a certain color.

When the first substrate (provided with the color filter segments) is disposed on the viewer side, external light reflection can effectively be prevented since the first light-interrupting layer employs a non-metallic material and the second light-interrupting layer comprising the molybdenum film is located behind the color filter segments via the passivation film and the transparent electrodes when viewed from the viewer side. Consequently, on the display face, good display characteristics can be attained based on a uniform reflection state. In this regard, when a color liquid crystal display device having a large display area (1280× 1024 pixels) was prepared and subjected to eye observation, a local coloring (a phenomenon such that a display region is locally changed to have a particular color) and excessive reflection of external light were not confirmed. thus improving a display quality in a light (bright) place and not causing fatigue of eyes in repetitive use for a long time.

(Second Embodiment)

FIGS. 3A–3E are sectional views of a first substrate 2 along a production process thereof.

Figure 3A:
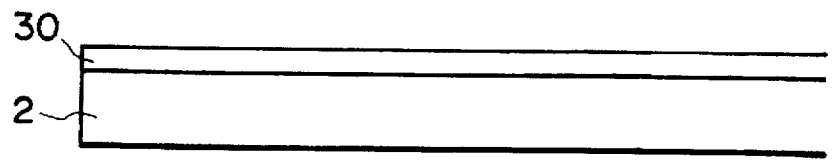
FIGS. 3A–3E are partially sectional views of a color liquid crystal display device according to a second embodiment of the present invention for, sequentially illustrating production processes of the display device.
Figure 3B:
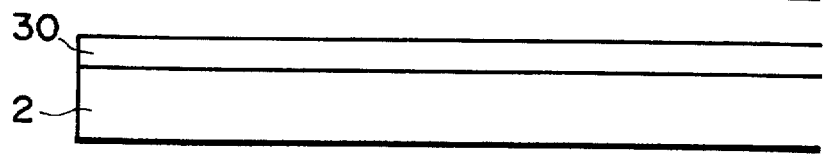
Figure 3C:
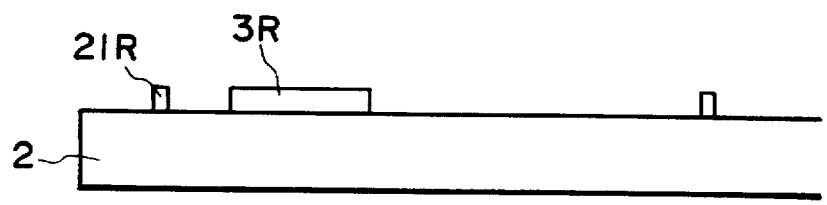
Figure 3D:
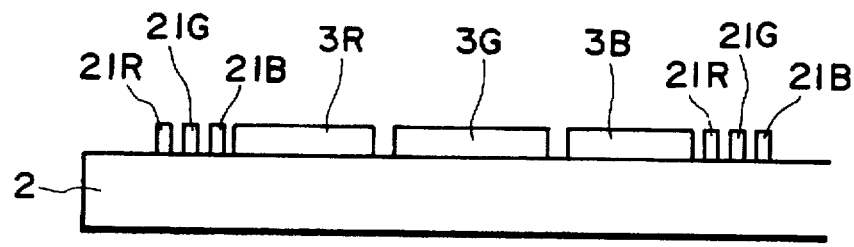
Figure 3E:
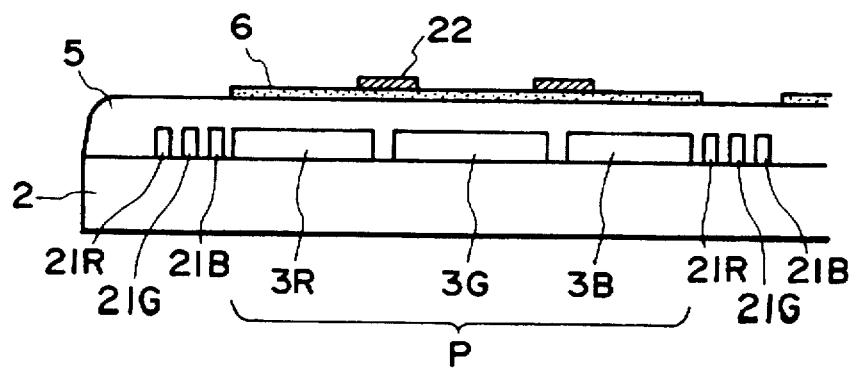

In this embodiment, as shown in FIG. 3E, a color liquid crystal display device is formed in the similar manner as in the first embodiment described above except that a first light-interrupting layer is consisting of three layers 21R, 21G and 21B each provided with a width of 3 μm together disposed at a prescribed spacing (a portion of a pixel spacing) corresponding to the spacing S in FIG. 2F. More specifically. a color filter segment and a layer having a color identical to the color filter segment (3R and 21R; 3G and 21G; or 3B and 21B) are formed at the same time through the photolithographic steps. Further, other members, such as transparent electrodes 6 and auxiliary electrodes 22 as a second light-interrupting layer are formed similarly as in the first embodiment.

In this embodiment, the first light-interrupting layer composed of a set of three layers 21R, 21G and 21B (for red, green and blue, respectively) is disposed at the prescribed spacing between adjacent two display pixels so as to display white as a whole when incident light from a backlight apparatus (not shown) passes through the prescribed portion.

Incidentally, similarly as in the first embodiment additional auxiliary electrodes 22 (as the second light-interrupting layer) may be disposed on the transparent substrate 6 (shown in FIG. 3E) at both end portions thereof (masking spacings between 3R and 21B and between 3B and 21R) so as to perform substantially complete light interruption at the spacings (corresponding to the spacings S as in FIG. 2F) between the pixels in combination with the first light-interrupting layers (21R, 21G and 21B).

According to the second embodiment of the color liquid crystal display device of the present invention, it is possible to attain effects similar to those in the first embodiment described above. In addition in the second embodiment, the first light-interrupting layer is arranged so as to provide a set of three colored layers (21R for red, 21G for green and 21B for blue) per each spacing S, so that an image display region is not locally changed to have a particular color.

In the above first and second embodiments, the first light-interrupting layer (21R, 21G and 21B) masks a portion of the pixel spacing between adjacent two display pixels (each having a region P) and the second light-interrupting layer (auxiliary electrodes 22) masks a remaining portion of the pixel spacing between color pixels. In these embodiment, however, it is possible to arrange so that the second light-interrupting layer masks the above portion of the pixel spacing (between adjacent two display pixels) and the first light-interrupting layer masks the remaining portion of the pixel spacing. In short, it is possible to effect any modification of the arrangement of the first and second light-interrupting layers so long as the entire pixel spacing is substantially masked or covered with the first and second light-interrupting layer as a whole in combination.

Further, in the above-described first and second embodiments, the pixel spacing between the color pixels is masked with the (first and second) light-interrupting layers formed on an identical (first) substrate having the color filter segments. However, it is possible to provide the second substrate with a (second) light-interrupting layer in the first and second embodiments.

In the following third to sixth embodiments, a light-interrupting member (first and second light-interrupting layers) provided to a first substrate and a light-interrupting member (second light-interrupting layer) provided to a second (opposite) substrate as a whole mask an entire pixel spacing between color pixels.

Figure 4:
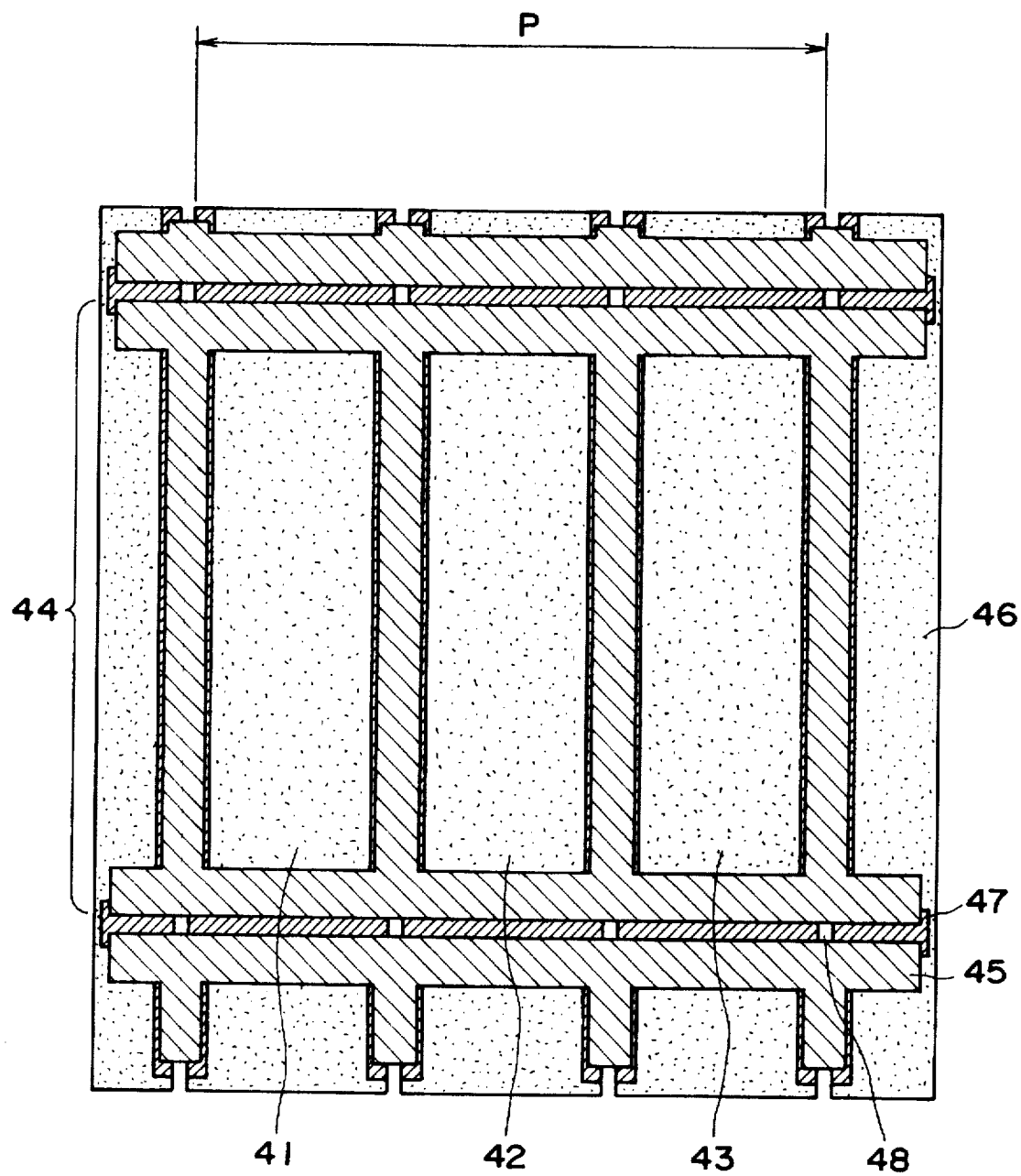
FIG. 4 is a plan view of a matrix electrode structure of a color liquid crystal display device according to a third embodiment and a fourth embodiment of the present invention.

FIG. 4 is a plan view showing a matrix electrode structure formed by (first and second) transparent electrodes provided to a pair of (first and second) substrates adopted in color liquid crystal display devices according to third and fourth embodiments of the present invention. Specifically, FIG. 4 shows a state of arrangement of respective transparent and auxiliary electrodes viewed from the first substrate (to be provided with color filter segments) side.

Referring to FIG. 4, on the first substrate, a group of (first) transparent electrodes (not shown) in the form of stripes (transparent electrode pattern) each having a width 44 are formed and thereon a group of auxiliary electrodes (auxiliary electrode pattern) 45 comprising a non-(light) transmissive material, such as metal are formed so as to contact or cover (coat) the transparent electrodes. Separately, on the first substrate, plural color filter segments (not shown) are disposed in superposition with (preferably below or under) the (first) transparent electrodes so as to overlap regions 41, 42 and 43 defined by the transparent electrode pattern (not shown) having the width 44 and the auxiliary electrode pattern 45.

On the second substrate, a group of (second) transparent electrodes (transparent electrode pattern) 46 are formed so as to intersect with the (first) transparent electrodes to constitute a matrix electrode structure. On the (second) transparent electrodes 46, a group of auxiliary electrodes (auxiliary electrode pattern) 47 comprising a non-transmissive material (e.g., metal) are formed so s to contact or cover the transparent electrodes 46.

On each of the first and second substrates, several layers (not shown) including an insulating layer and an alignment control layer (for controlling alignment of liquid crystal molecules) are formed so as to cover the respective transparent and auxiliary electrodes. The first and second substrates treated as described above are caused to be opposite to and spaced apart from each other to provide a prescribed gap (cell gap), which is then filled with a liquid crystal to prepare a color liquid crystal display device (not shown).

As described above with reference to FIG. 4, the color liquid crystal display device having the matrix electrode structure contain display pixels each having a length (width) P and a width (length) 44 and including three color pixels 41, 42 and 43 and a pixel spacing between the color pixels. The entire pixel spacing (between the color pixels including between the adjacent display pixels) except for regions 48 in FIG. 4 is masked with the auxiliary electrode patterns 45 and 47 (functioning as the second light-interrupting layer). The regions 48 (a remaining portion of the pixel spacing) are masked with a first light-interrupting layer comprising a material identical to that of at least one of the plural color filter segments as described hereinbelow (third and fourth embodiments).

(Third Embodiment)

Figure 5:
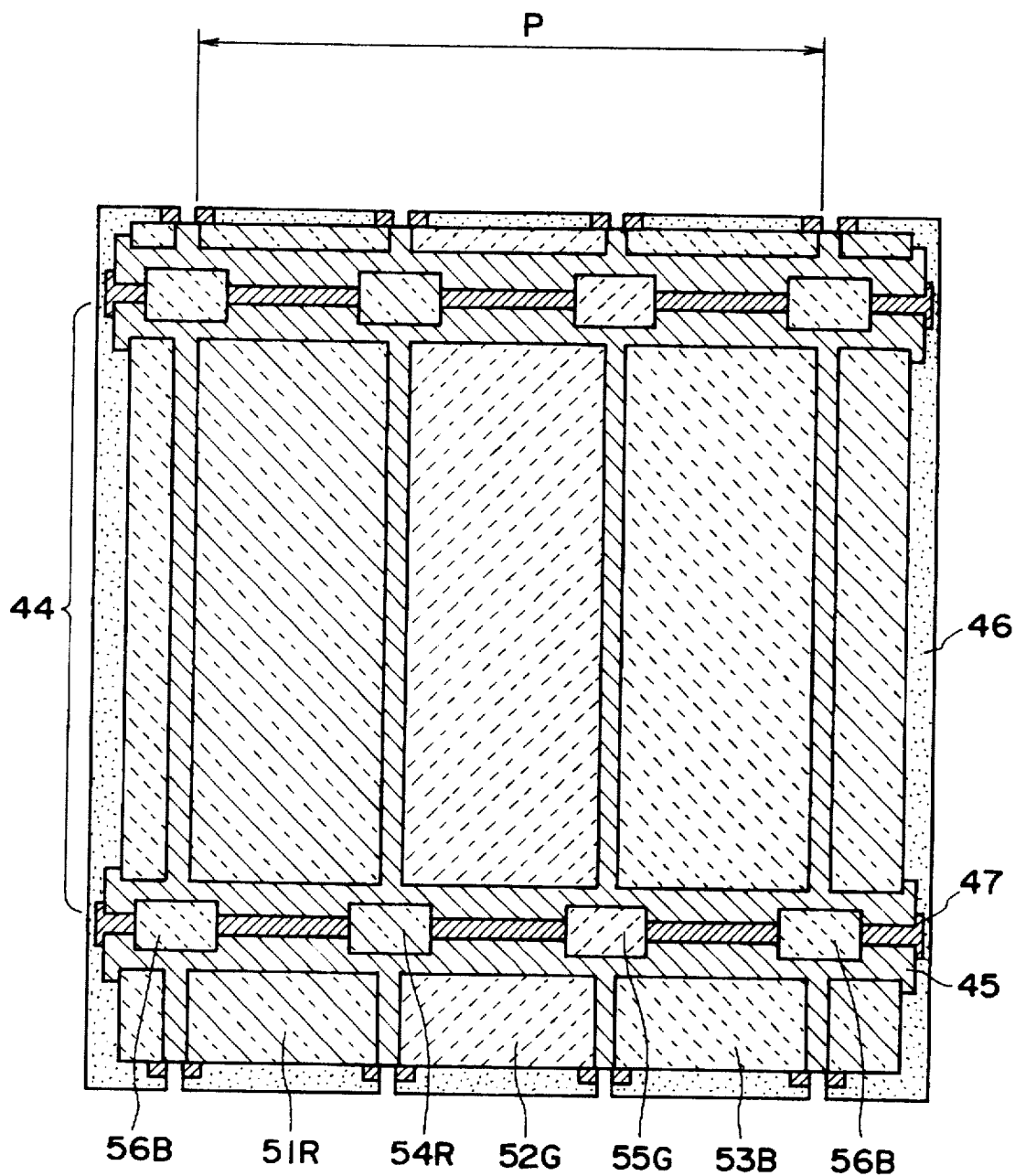
FIGS. 5 and 6 are plan views each for illustrating arrangement of electrodes, a color filter and a light-interrupting layer used in color liquid crystal display devices according to a third embodiment and a fourth embodiment of the present invention, respectively.

FIG. 5 is a plan view of a color liquid crystal display device according to a third embodiment of the present invention wherein an arrangement of transparent and auxiliary electrodes, color filter segments, and a light-interrupting member viewed from the first substrate side is specifically shown.

Referring to FIG. 5, on the first substrate, three color filter segments including a red filter 51R, a green filter 52G and a blue filter 53B per one display pixel are formed and disposed in a position closer to the first substrate than the first transparent electrodes. The three color filter segments 51R, 52G and 53B are arranged so as to correspond to the regions (color pixels) 41, 42 and 43 (shown in FIG. 4), respectively.

A (first) light-interrupting member (layer) including a layer 54R comprising a material identical to that of the red filter 51R, a layer 55G comprising a material identical to that of the green filter 52G, and a layer 56B comprising a material identical to that of the blue filter 53B are formed so as to mask the regions 48 (shown in FIG. 4) simultaneously with and preferably on an identical level with the color filter segments 51R, 52G and 53B in an identical step.

As apparent from FIGS. 4 and 5, the entire pixel spacing defined by the color pixels 41, 42 and 43 (FIG. 4) and not contributing to (color) display is substantially masked (covered) with the light-interrupting member (the layers 54R, 55G and 56B) and auxiliary electrode pattern 45 provided to the first substrate and the auxiliary electrode pattern 47 provided to the second substrate in combination by preventing leakage (escape) of light from the pixel spacing.

According to the third embodiment of the color liquid crystal display device of the present invention, it is possible to attain effects similar to those in the first embodiment described above. Specifically, the light-interrupting layers 54R, 55G and 56B and the color filter segments 51R, 52G and 53B are formed at the same time by using the identical materials (e.g., non-metallic colored resins) respectively, whereby a production process and a device structure are simplified. Further, as the auxiliary electrode patterns 45 and 47 (each used as the second light-interrupting layer) are disposed sufficiently behind the display face when the device is viewed from the first substrate side, an excessive external light reflection (due to external light from the viewer side in a light (sunny) place) can effectively be suppressed.

In the third embodiment, it is preferred to optimally select and control an areal ratio and an arrangement of the (first) light-interrupting layers 54R, 55G and 56B in view of, e.g., color balance of the entire display region.

(Fourth Embodiment)

Figure 6:
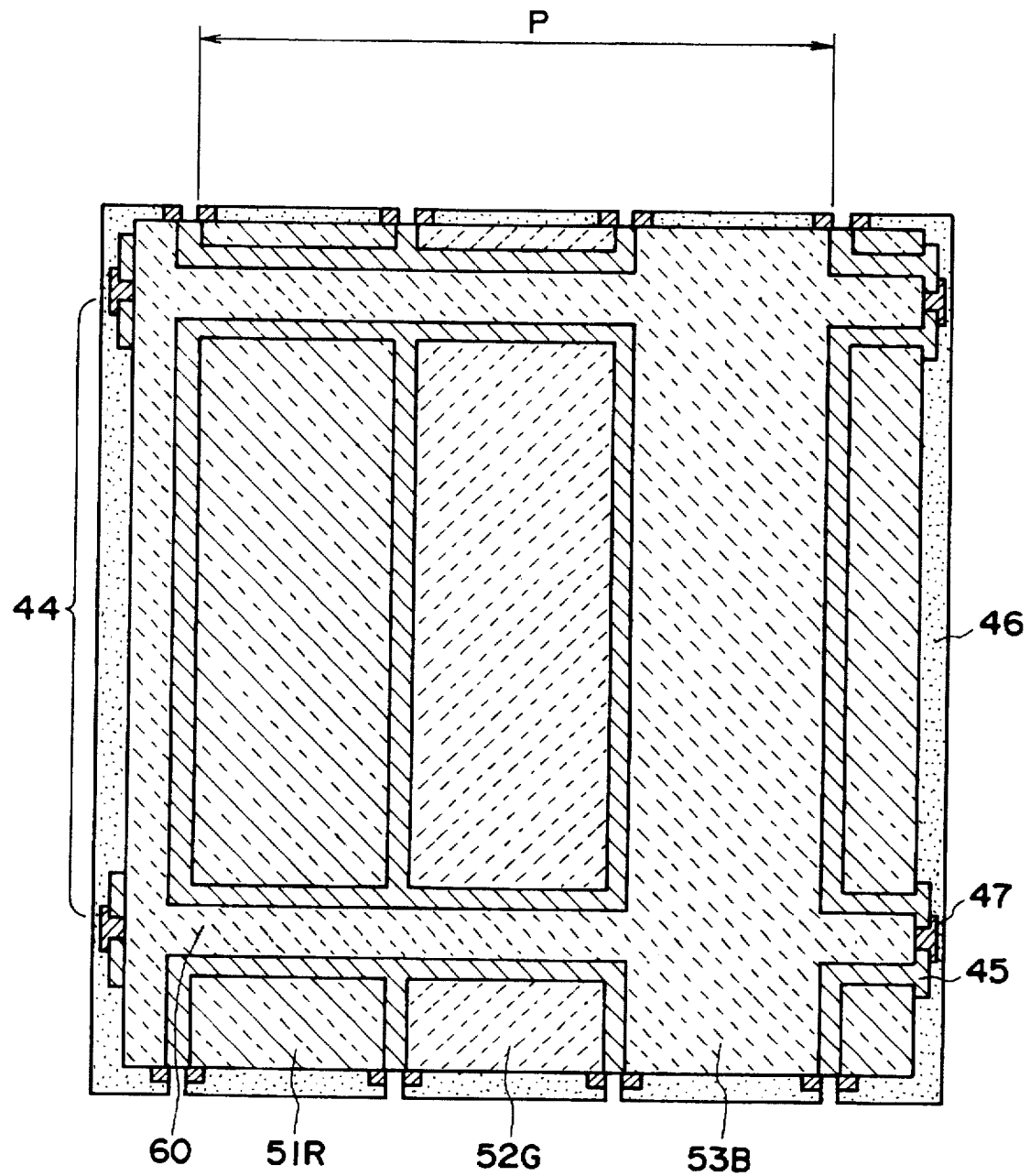

FIG. 6 is a plan view of a fourth embodiment of the color liquid crystal display device according to the present invention similar to FIG. 5 except for employing a different first light-interrupting member (layer), wherein identical structural members used in the third and fourth embodiments are indicated by identical reference numerals.

In the fourth embodiment (FIG. 6), different from the third embodiment (FIG. 5), a blue color filter segment (blue filter) 53B formed on the first substrate extends to a region 60 between first transparent electrodes (formed on the first substrate) each having a width 44 and functions as a (first) light-interrupting layer masking a peripheral portion (including the regions 48 shown in FIG. 4) of each display pixel, thus masking the entire pixel spacing as a whole together with an auxiliary electrode pattern 45 formed on the first substrate and an auxiliary electrode pattern 47 formed on the second substrate.

According to this (fourth) embodiment, in addition to the effects and functions described in the third embodiment, the first light-interrupting layer masking the regions 48 (FIG. 4) is only consisting of the blue filter 53B providing the lowest (light) transmittance with respect to an identical filter thickness (herein, "transmittance" refers to one given under thus condition) among the color filters 51R, 52G and 53B, thus further effectively suppressing light leakage.

Figure 7:
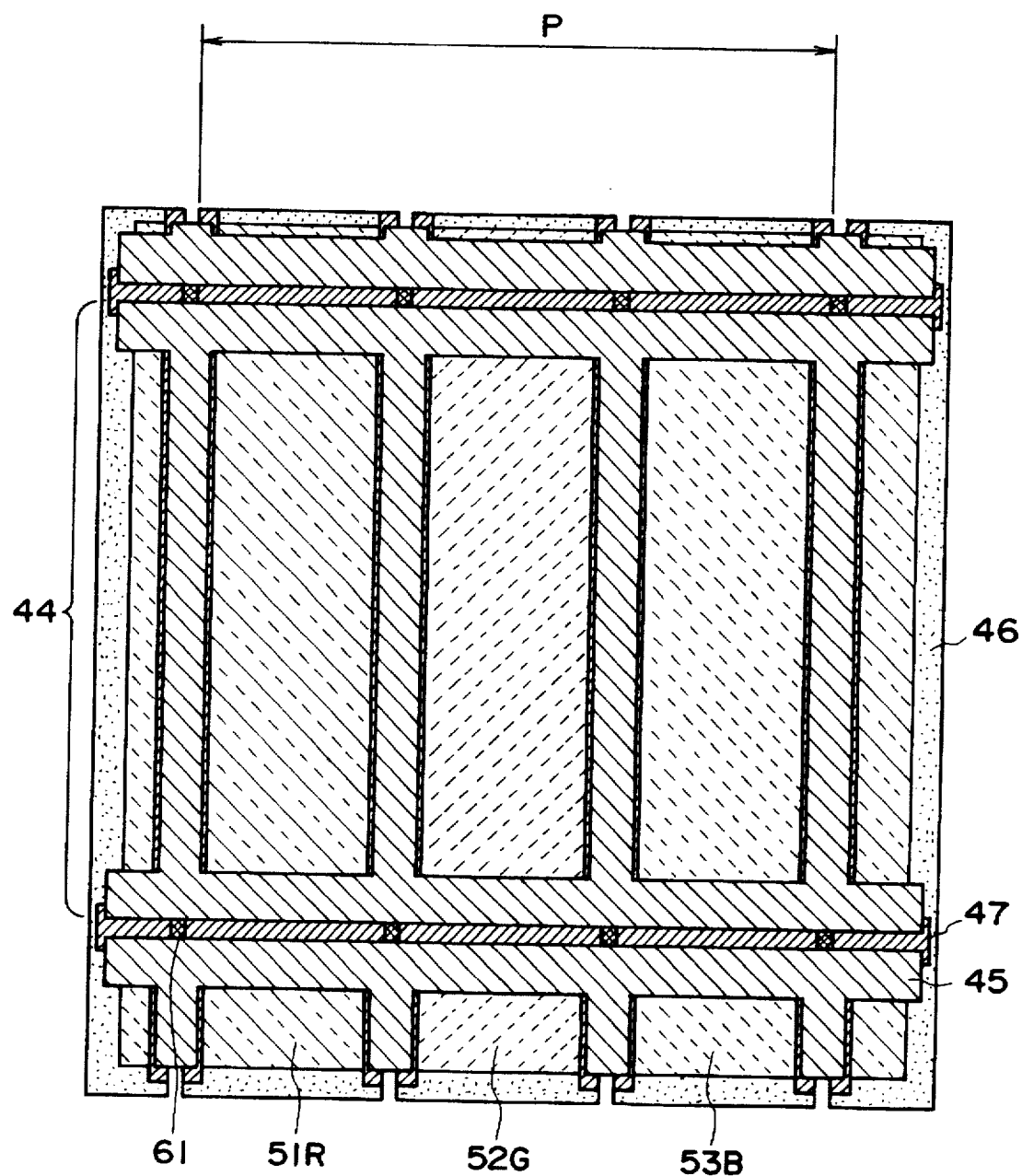
FIG. 7 is a plan view for illustrating states of color displaying and light interruption in a third embodiment and a fourth embodiment of the present invention.

FIG. 7 is a plan view for illustrating how to effect color display and light-interruption (masking) in the above-described third and fourth embodiments.

Referring to FIG. 7, color display is performed by using three color filter segments (red filter 51R, green filter 52G, and blue filter 53B) singly or in combination of two or three filters. A pixel spacing between color pixels (41 to 43 shown in FIG. 4) is principally masked with auxiliary electrode patterns 45 and 47 formed on first and second substrates, respectively. Further, small regions 61 remaining as a portion of the pixel spacing are masked with the light-interrupting layers 54R, 55G and 56B shown in FIG. 5 (Third Embodiment) or with the blue filter 53B shown in FIG. 6 (Fourth Embodiment). As a result, the entire pixel spacing is substantially light-interrupted by preventing leakage of incident light from the backlight apparatus.

Figure 8:
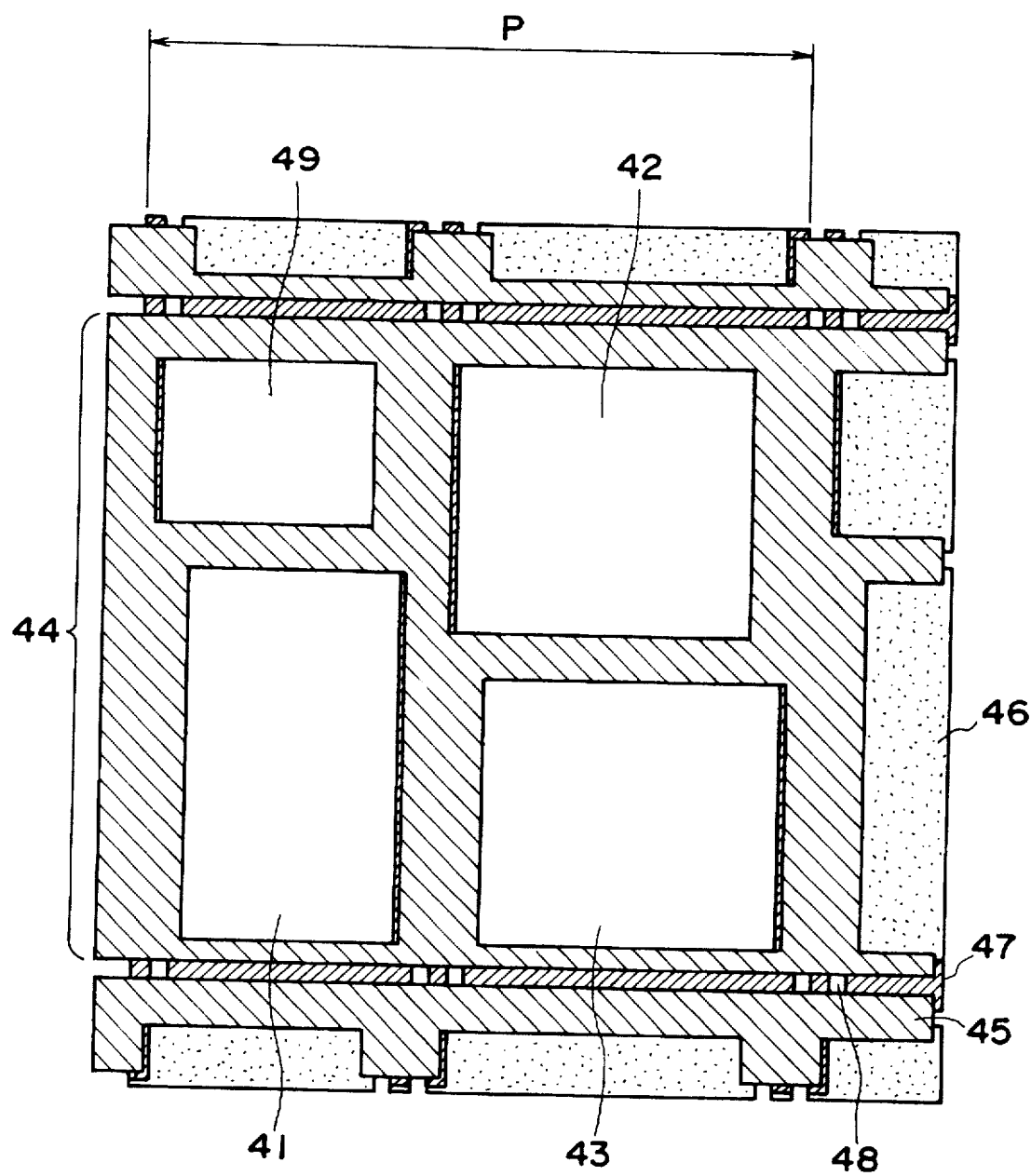
FIG. 8 is a plan view of a matrix electrode structure of a color liquid crystal display device according to a fifth embodiment and a sixth embodiment of the present invention.

FIG. 8 is a plan view showing a matrix electrode structure formed by (first and second) transparent electrodes provided to a pair of (first and second) substrates adopted in color liquid crystal display devices according to fifth and sixth embodiments of the present invention. Specifically, FIG. 8 shows a state of arrangement of respective transparent and auxiliary electrodes viewed from the first substrate (to be provided with color filter segments) side.

Referring to FIG. 8, the device structure is principally similar to that shown in FIG. 4 except that four regions 41, 42, 43 and 49 are provided per one display pixel (having widths P and 44), wherein structural members identical to those shown in FIG. 4 are indicated by identical reference numerals.

Figure 10:
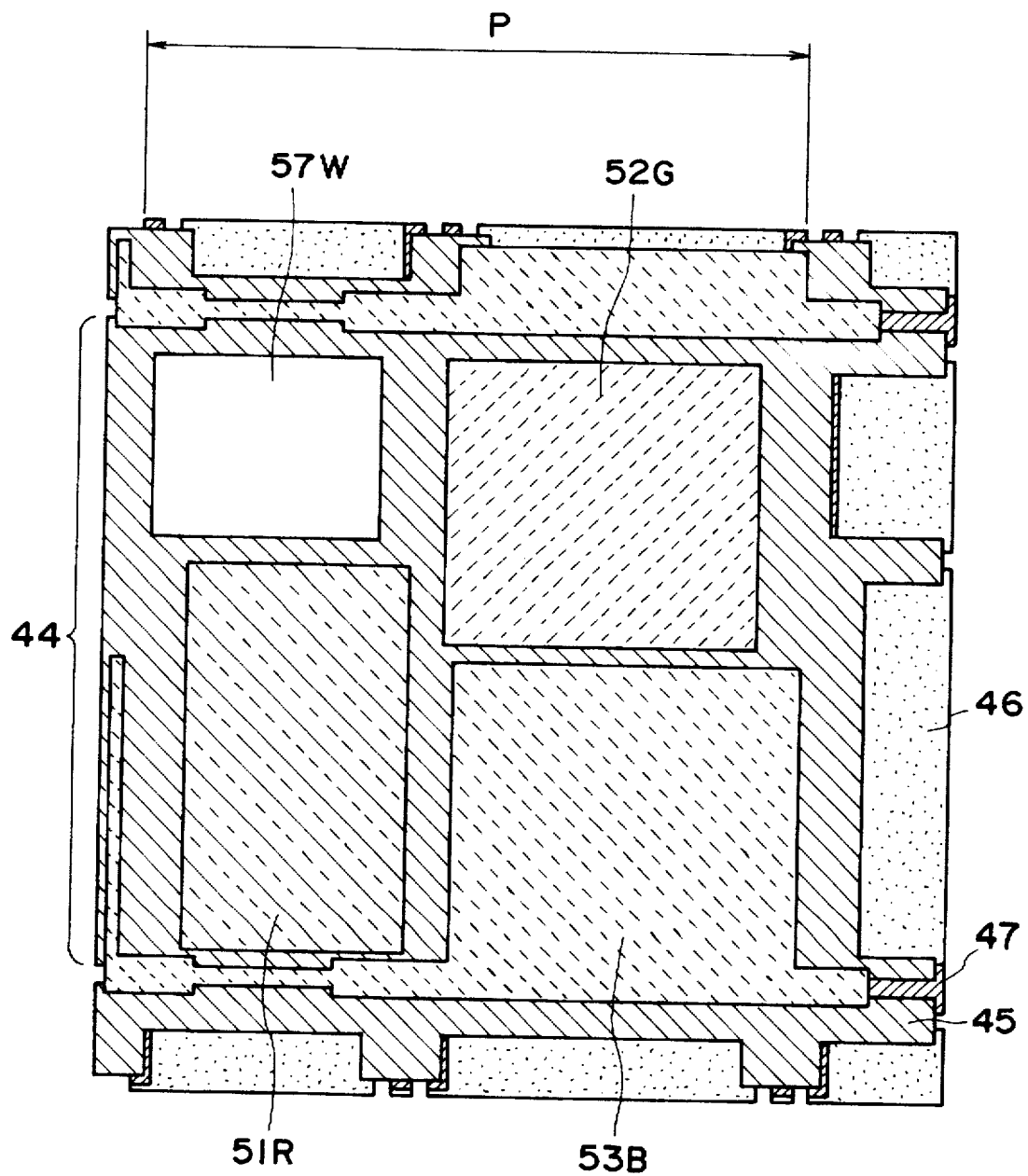
Figure 11:
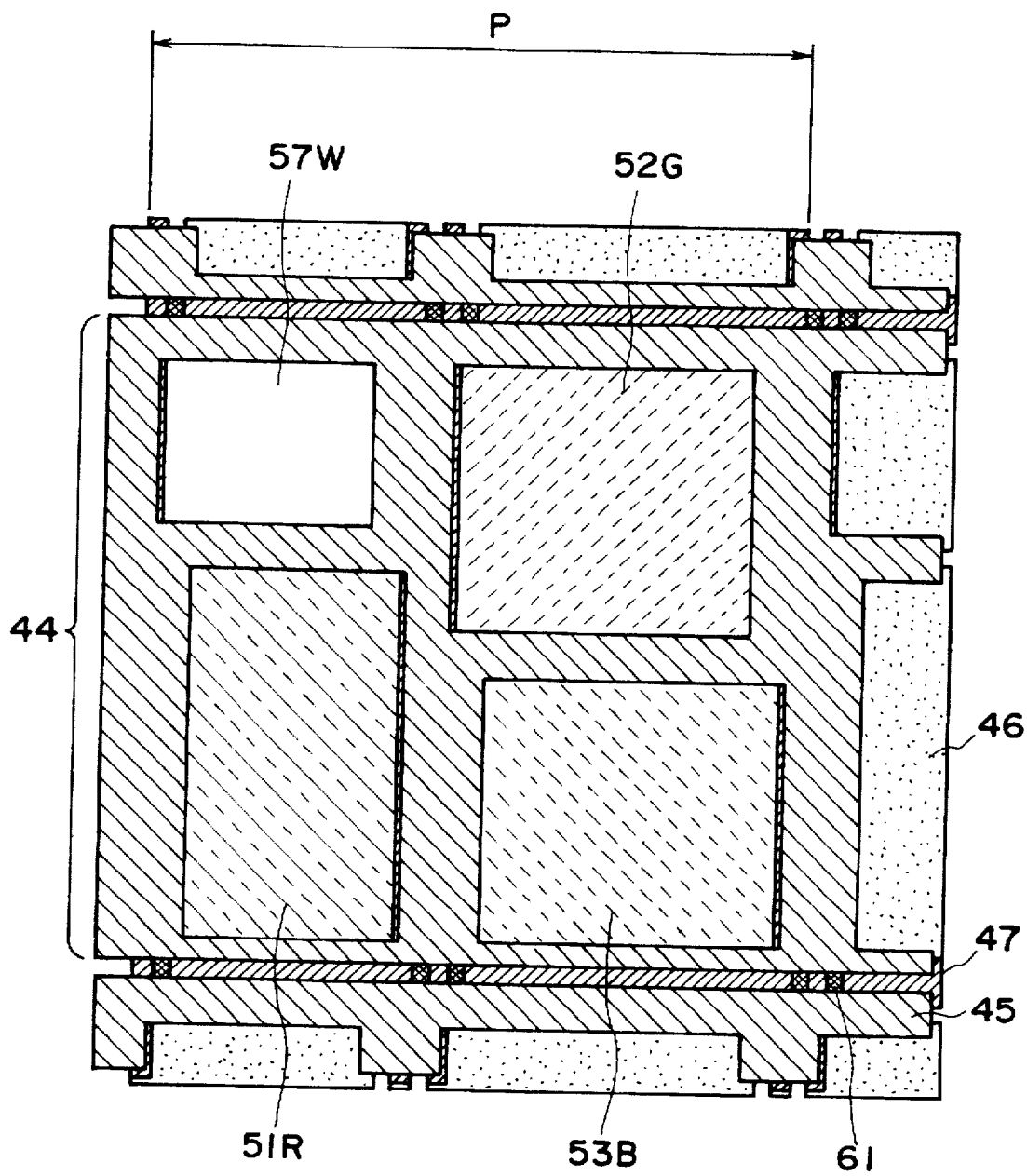
FIG. 11 is a plan view for illustrating states of color displaying and light interruption in a fifth embodiment and a sixth embodiment of the present invention.

More specifically, the four regions 41, 42, 43 and 49 are defined by the (first) transparent electrode pattern (having the width 44) and the auxiliary electrode patterns 45 and 47. Four color filter segments (not shown) of red, green, blue and white are disposed so as to overlap the four regions 41, 42, 43 and 49, respectively, as shown in FIGS. 9–11.

Incidentally, in the following FIGS. 9–11, structural members identical to FIG. 8 are indicated by identical reference numerals and the respective arrangements are viewed from the first substrate side.

(Fifth Embodiment)

Figure 9:
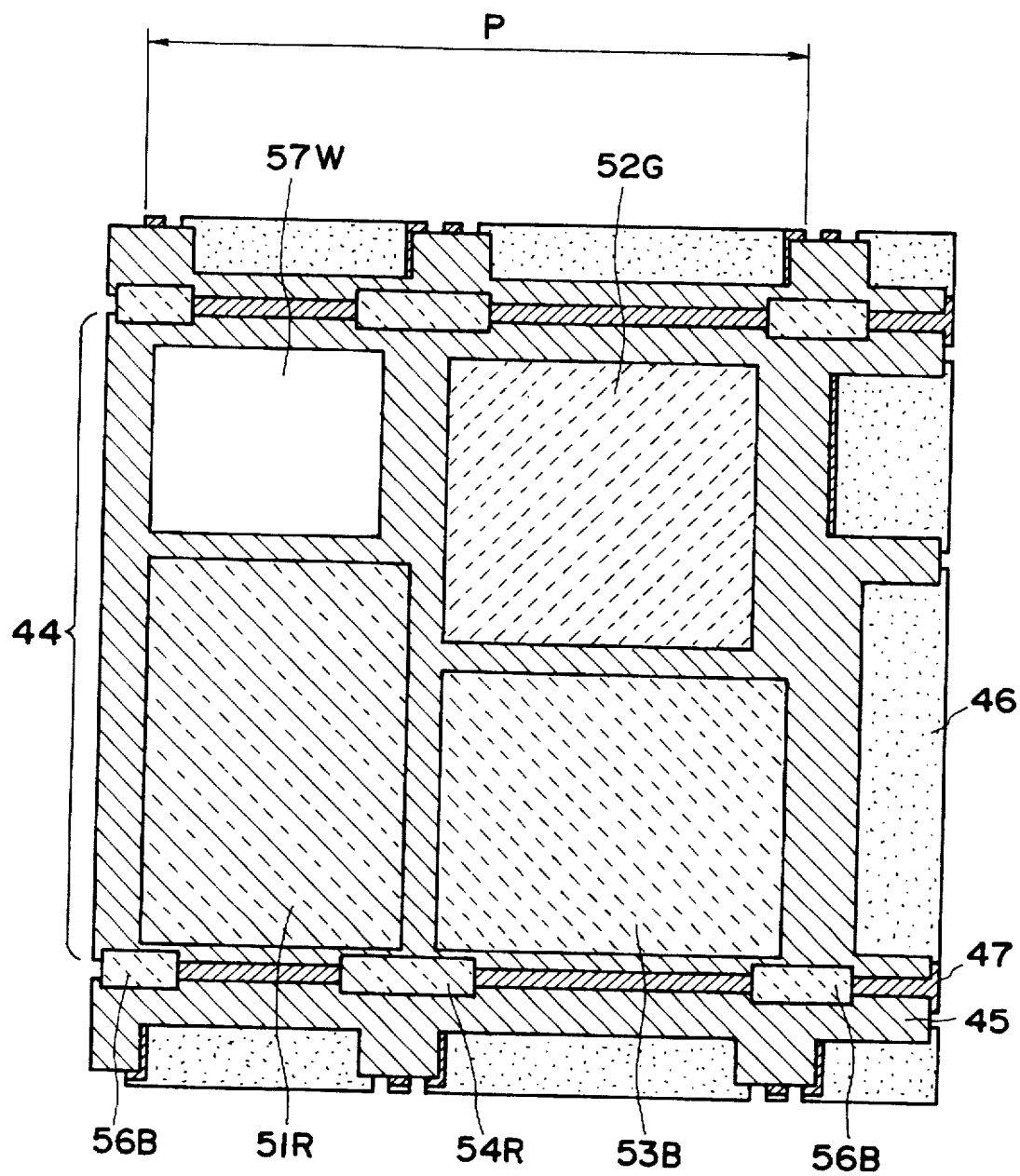
FIGS. 9 and 10 are plan views each for illustrating arrangement of electrodes, a color filter and a light-interrupting layer used in color liquid crystal display devices according to a fifth embodiment and a sixth embodiment of the present invention, respectively.

FIG. 9 is a plan view of a color liquid crystal display device according to a fifth embodiment of the present invention wherein an arrangement of transparent and auxiliary electrodes, color filter segments, and a light-interrupting member is specifically shown similarly as in FIG. 8.

Referring to FIG. 9, on the first substrate, four color filter segments including a red filter 51R, a green filter 52G, a blue filter 53B and a white (clear) filter 57W per one display pixel are formed and disposed in a position closer to the first substrate than the first transparent electrodes. The four color filter segments 51R, 52G, 53B and 57W are arranged so as to correspond to the regions (color pixels) 41, 42, 43 and 49 (shown in FIG. 8), respectively.

A (first) light-interrupting member (layer) including a layer 54R comprising a material identical to that of the red filter 51R and a layer 56B comprising a material identical to that of the blue filter 53B are formed so as to mask regions 48 (shown in FIG. 8) simultaneously with and preferably on an identical level with the color filter segments 51R and 53B in an identical step.

As apparent from FIGS. 8 and 9, the entire pixel spacing defined by the color pixels 41, 42, 43 and 49 (FIG. 8) and not contributing to (color) display is substantially masked (covered) with the light-interrupting member (the layers 54R and 56B) and auxiliary electrode pattern 45 provided to the first substrate and the auxiliary electrode pattern 47 provided to the second substrate in combination by preventing leakage (escape) of light from the pixel spacing.

(Sixth Embodiment)

FIG. 10 is a plan view of a sixth embodiment of the color liquid crystal display device according to the present invention similar to FIG. 9 except for employing a different first light-interrupting member (layer).

In the sixth embodiment (FIG. 10), different from the fifth embodiment (FIG. 9), a blue color filter segment (blue filter) 53B formed on the first substrate extends to a region between first transparent electrodes (formed on the first substrate) each having a width 44 and functions as a (first) light-interrupting layer masking a peripheral portion (including the regions 48 shown in FIG. 8) of each display pixel, thus masking the entire pixel spacing as a whole together with an auxiliary electrode pattern 45 formed on the first substrate and an auxiliary electrode pattern 47 formed on the second substrate.

According to this (sixth) embodiment, the first light-interrupting layer masking the regions 48 (FIG. 8) is only consisting of the blue filter 53B providing the lowest (light) transmittance among the color filters 51R, 52G, 53B and 57W, thus effectively suppressing light leakage.

FIG. 11 is a plan view for illustrating how to effect color display and light-interruption (masking) in the above-described fifth and sixth embodiments.

Referring to FIG. 11, color display is performed by using three color filter segments (red filter 51R, green filter 52G, blue filter 53B and white filter 57W) singly or in combination of two to four filters. A pixel spacing between color pixels (41, 42, 43 and 49 shown in FIG. 8) is principally masked with auxiliary electrode patterns 45 and 47 formed on first and second substrates, respectively. Further, small regions 61 (regions 48 in FIG. 8) remaining as a portion of the pixel spacing are masked with the light-interrupting layers 54R and 56B shown in FIG. 9 (Fifth Embodiment) or with the extended blue filter 53B shown in FIG. 10 (Sixth Embodiment). As a result, the entire pixel spacing is substantially light-interrupted by preventing leakage of incident light from the backlight apparatus.

As described above, according to the fifth and sixth embodiments of the color liquid crystal display devices of the present invention, it is possible to attain effects similar to those in the third and fourth embodiments described above, respectively. Specifically, the light-interrupting layer (54R and 56B in the fifth embodiment or 53B in the sixth embodiment) and the color filter segments 51R, 52G, 53B and 57W are formed at the same time with respect to identical colors by using the identical materials (e.g., non-metallic colored resins) respectively, whereby a production process and a device structure are simplified. Further, as the auxiliary electrode patterns 45 and 47 (each used as the second light-interrupting layer) are disposed sufficiently behind the display face when the device is viewed from the first substrate side, an excessive external light reflection (due to external light from the viewer side in a light (sunny) place) can effectively be suppressed.

Further, in the fifth and sixth embodiments, the regions (48 in FIG. 8 or 61 in FIG. 11) which cannot be masked with the auxiliary electrode patterns 45 and 47 are masked with the light-interrupting layer comprising the layer 56B assuming blue (providing the lowest transmittance among the four colors) and the layer 54R assuming red (providing the second lowest transmittance) in the fifth embodiment or masked with the light-interrupting layer (the blue color filter segment 53B) providing the lowest transmittance, thus further effectively preventing light leakage at the pixel spacing compared with the case of using a light-interrupting member including layers assuming other colors.

In the color liquid crystal display device according to the present invention, it is possible to use various liquid crystal materials including those of a twisted nematic (TN) type, those of a super-twisted nematic (STN) type, and those assuming chiral smectic phase. Further, in the above-described first to sixth embodiments, a simple matrix-type liquid crystal display device is employed but an active matrix-type liquid crystal display device using, e.g., thin film transistor (TFT) may be adopted.

As described hereinabove, the color liquid crystal display device and the process for producing the device according to the present invention provide the following advantages (i) to (iv).

(i) High contrast images excellent in display qualities are displayed by substantially masking an entire pixel spacing between color pixels with first and second light-interrupting layers in combination.

(ii) The first light-interrupting layer comprises a material identical to that of at least one of plural color filter segments and can be formed simultaneous with the corresponding color filter segments, and the second light-interrupting layer is consisting of a group of auxiliary electrodes, thus not employing an additional metallic light-interrupting member (e.g., Cr layer) only for the purpose of masking (light interruption). As a result, a device structure and a production process of the color liquid crystal display device become simple and a product yield thereof is also improved.

(iii) The first light-interrupting layer is arranged in view of color balance with respect to a prescribed area or (light) transmittance of the layer, so that no display region locally assumes a particular color and a degree of light transmission can effectively be minimized.

(iv) The first light-interrupting layer comprises a non-metallic color filter material and the metallic second light-interrupting layer is disposed comparatively behind a display face of the device, whereby an excessive reflection of external light can be prevented to improve display qualities in a light (sunny) place and not adversely affect (not cause fatigue of) viewer's eyes in repetitive use for a long time.

What is claimed is:

1. A color liquid crystal display device, comprising:

a first substrate having thereon a layer of plural color filter segments and a layer of first transparent electrodes disposed in superposition with the layer of color filter segments; a second substrate disposed opposite to and spaced apart from the first substrate and having thereon a layer of second transparent electrodes intersecting with the first transparent electrodes; and a liquid crystal disposed between the first and second substrates so as to form plural color pixels each at a region of intersection of the first and second transparent electrodes superposed with one of the color filter segments while leaving a pixel spacing between the plural color pixels, wherein the first substrate is provided with a first light-interrupting layer comprising a material identical to that of at least one of the plural color filter segments and disposed at a portion of the pixel spacing so as to mask the portion, and at least one of the first and second substrates is provided with a second light-interrupting layer masking a remaining portion of the pixel spacing.

2. A device according to claim 1, wherein both of the first and second substrates are each provided with the second light-interrupting layer comprising a layer of auxiliary electrodes contacting the first transparent electrodes or the second transparent electrodes, respectively.

3. A device according to claim 1, wherein the second light-interrupting layer comprises a metallic material.

4. A device according to claim 1, wherein the first light-interrupting layer comprises plural materials identical to those of all the plural color filter segments.

5. A device according to claim 1, wherein the first light-interrupting layer comprises a material identical to that of a color filter segment providing a lowest transmittance.

6. A device according to claim 1, wherein the plural color filter segments include at least one of three color filter segments of red, green and blue.

7. A device according to claim 6, wherein the first light-interrupting layer comprises plural portions each comprising a single layer which comprises a material identical to that of one of the plural color filter segments.

8. A device according to claim 7, wherein the plural color pixels and their corresponding pixel spacing form display pixels and each of the plural portions of the first light-interrupting layer is disposed between adjacent display pixels.

9. A device according to claim 6, wherein the first light-interrupting layer comprises plural portions each comprising plural layers which are disposed in horizontal alignment with each other and comprise plural materials identical to those of plural color filter segments different in color.

10. A device according to claim 9, wherein the plural color pixels and their corresponding pixel spacings form display pixels and the first light-interrupting layer is disposed between adjacent display pixels.

11. A device according to claim 9, wherein the first light-interrupting layer comprises a layer comprising a material identical to that of a color filter segment of red, a layer comprising a material identical to that of a color filter segment of green, and a layer comprising a material identical to that of a color filter segment of blue.

12. A device according to claim 6, wherein the first light-interrupting layer comprises three layers including a layer comprising a material identical to that of a color filter segment of red, a layer comprising a material identical to that of a color filter segment of green, and a layer comprising a material identical to that of a color filter segment of blue.

13. A device according to claim 6, wherein the first light-interrupting layer comprises a layer comprising a material identical to that of a color filter segment of red or a layer comprising a material identical to that of a color filter segment of blue.

14. A device according to claim 6, wherein the first light-interrupting layer is a layer comprising a material identical to that of a color filter segment of blue.

15. A device according to claim 6, wherein the plural color filter segments include a color filter segment of blue extending to the portion of the pixel spacing and functioning as the first light-interrupting layer.

16. A device according to claim 1, wherein the plural color filter segments include at least one of four color filter segments of red, green, blue and white.

17. A device according to claim 16, wherein the first light-interrupting layer comprises a layer comprising a material identical to that of one of the plural color filter segments.

18. A device according to claim 16, wherein the first light-interrupting layer comprises a layer comprising a material identical to that of a color filter segment of red or a layer comprising a material identical to that of a color filter segment of blue.

19. A device according to claim 16, wherein the first light-interrupting layer is a layer comprising a material identical to that of a color filter segment of blue.

20. A device according to claim 16, wherein the plural color filter segments include a color filter segment of blue extending to the portion of the pixel spacing and functioning as the first light-interrupting layer.

21. A device according to claim 1, wherein the first transparent electrodes and the second transparent electrodes form a matrix electrode structure.

22. A device according to claim 21, wherein both of the first and second substrates are each provided with the second light-interrupting layer, and the pixel spacing is divided into a first portion masked with at least one of the second light-interrupting layers and a second portion which is not masked with either one of the second light-interrupting layers but is masked with the first light-interrupting layer.

23. A device according to claim 1, wherein the first substrate is disposed on an observer side.

24. A process for producing a color liquid crystal display device of any of claims 1–23, comprising the steps of:
  (a) forming the plural color filter segments on the first substrate while leaving a prescribed spacing between the plural filter segments,
  (b) forming the first light-interrupting layer at a portion of the pixel spacing so as to mask the portion,
  (c) forming the first transparent electrodes on or above the first light-interrupting layer,
  (d) forming the second light-interrupting layer on the first transparent electrodes so as to mask the portion of the pixel spacing to provide a treated first substrate,
  (e) forming the second transparent electrodes on or above a second substrate,
  (f) forming the second light-interrupting layer on the second transparent electrodes so as to mask the remaining portion of the pixel spacing to provide the treated second substrate, and
  (g) disposing the liquid crystal between the treated first substrate and the treated second substrate while oppositely spacing the substrates apart from each other and causing the first and second transparent electrodes to intersect with each other and face the liquid crystal so as to form the plural color pixels each at a region of intersection of the first and second transparent electrodes superposed with one of the color filter segments while leaving the pixel spacing between the plural color pixels.

* * * * *

UNITED STATES PATENT AND TRADEMARK OFFICE
CERTIFICATE OF CORRECTION

PATENT NO. : 5,777,707
DATED : JULY 7, 1998
INVENTOR(S) : YUICHI MASAKI ET AL.

Page 1 of 3

It is certified that error appears in the above-identified patent and that said Letters Patent is hereby corrected as shown below:

COLUMN 1

Line 33, "electrode" should read --electrodes--.

COLUMN 2

Line 2, ""essentially employs" should read --requires--.

COLUMN 3

Line 17, "for," should read --for--;
    Line 56, "segment" should read --segment(s)--; and
    Line 57, "(s)" should be deleted.

COLUMN 6

Line 28, "a" should read --and--, and "are" should read --is--.

COLUMN 7

Line 24, "adjacent two" should read --two adjacent--;
    Line 46, "adjacent two" should read --two adjacent--;
    Line 50, "embodiment," should read --embodiments--; and
    Line 52, "adjacent two" should read --two adjacent--.

UNITED STATES PATENT AND TRADEMARK OFFICE
CERTIFICATE OF CORRECTION

PATENT NO. : 5,777,707

DATED : JULY 7, 1998

INVENTOR(S) : YUICHI MASAKI ET AL.

It is certified that error appears in the above-identified patent and that said Letters Patent is hereby corrected as shown below:

COLUMN 8

Line 32, "s" should read --as--.

COLUMN 9

Line 62, "thus" should read --this--.

COLUMN 12

Line 7, "e.g.," should read --e.g., a--.

COLUMN 14

Line 31, "a" should read --the--.

UNITED STATES PATENT AND TRADEMARK OFFICE
CERTIFICATE OF CORRECTION

PATENT NO. : 5,777,707
DATED : JULY 7, 1998
INVENTOR(S) : YUICHI MASAKI ET AL.

Page 3 of 3

It is certified that error appears in the above-identified patent and that said Letters Patent is hereby corrected as shown below:

On the title page, Item [56] should read:

Line FPD, "250416" should read --62-250416--; and, "294222" should read --62-294222--.

Signed and Sealed this

Twenty-fifth Day of May, 1999

Attest:

Q. TODD DICKINSON

Attesting Officer

Acting Commissioner of Patents and Trademarks